(12) United States Patent
Chen et al.

(10) Patent No.: US 9,986,602 B2
(45) Date of Patent: May 29, 2018

(54) ENCLOSURE FOR HEATING THREE DIMENSIONAL STRUCTURE

(71) Applicant: The Boeing Company, Chicago, IL (US)

(72) Inventors: Cameron Kai-Ming Chen, Seattle, WA (US); Robert James Miller, Seattle, WA (US); Marc Rollo Matsen, Seattle, WA (US); Leah Gillian Glauber, Seattle, WA (US); James M. Kestner, Seattle, WA (US); Christopher John Hottes, Seattle, WA (US); Wendi Lynn Pickett Otto, Everett, WA (US)

(73) Assignee: The Boeing Company, Chicago, IL (US)

( * ) Notice: Subject to any disclaimer, the term of this patent is extended or adjusted under 35 U.S.C. 154(b) by 445 days.

(21) Appl. No.: 14/640,234

(22) Filed: Mar. 6, 2015

(65) Prior Publication Data

US 2016/0257034 A1 Sep. 8, 2016

(51) Int. Cl.
| | |
|---|---|
| *B29C 35/02* | (2006.01) |
| *H05B 6/10* | (2006.01) |
| *B29C 35/00* | (2006.01) |
| *H05B 6/40* | (2006.01) |
| *B29C 35/08* | (2006.01) |

(52) U.S. Cl.
CPC ......... *H05B 6/105* (2013.01); *B29C 35/0805* (2013.01); *H05B 6/40* (2013.01); *B29C 2035/0811* (2013.01); *B29C 2035/0816* (2013.01); *H05B 2206/023* (2013.01)

(58) Field of Classification Search
CPC .... H05B 6/105; H05B 6/40; H05B 2206/023; B29C 35/0805; B29C 2035/0816; B29C 35/0227; B29C 2035/0811; B29C 70/44
USPC ........... 425/174.8 R; 264/486, 487, 314, 315
See application file for complete search history.

(56) References Cited

U.S. PATENT DOCUMENTS

| | | | |
|---|---|---|---|
| 3,946,349 A | 3/1976 | Haldeman, III | |
| 4,366,356 A | 12/1982 | Ando | |
| 5,313,037 A | 5/1994 | Hansen et al. | |
| 6,528,771 B1 | 3/2003 | Matsen et al. | |
| 6,747,253 B1 * | 6/2004 | Firth | H05B 6/105 |
| | | | 219/634 |
| 6,824,724 B2 * | 11/2004 | Mori | B29D 30/0601 |
| | | | 264/315 |
| 6,884,975 B2 | 4/2005 | Matsen et al. | |

(Continued)

FOREIGN PATENT DOCUMENTS

WO WO 2014020342 A2 * 2/2014 ............. B29C 70/46

*Primary Examiner* — Nahida Sultana
(74) *Attorney, Agent, or Firm* — McDonnell Boehnen Hulbert & Berghoff LLP

(57) ABSTRACT

An enclosure for heating a three dimensional structure. The enclosure comprising a body defining a cavity therein. The cavity sized to receive a three dimensional structure. A plurality of heating blankets configured to heat the three dimensional structure to a substantially uniform temperature. At least one of the plurality of heating blankets comprises a conductor for receiving current and generating a magnetic field in response thereto, a first susceptor wire comprising an alloy having a first Curie temperature point and a second susceptor wire. The second susceptor wire comprising a second Curie temperature point that is different than the first Curie temperature point of the first susceptor wire.

18 Claims, 7 Drawing Sheets

(56) References Cited

U.S. PATENT DOCUMENTS

| | | | |
|---|---|---|---|
| 8,330,086 B2* | 12/2012 | Miller | B29C 73/30 |
| | | | 156/272.4 |
| 2002/0015746 A1* | 2/2002 | Mitamura | B29C 35/0272 |
| | | | 425/50 |
| 2002/0015747 A1* | 2/2002 | Mitamura | B29D 30/0645 |
| | | | 425/50 |
| 2002/0029842 A1* | 3/2002 | Nishida | B29C 35/06 |
| | | | 156/171 |
| 2005/0035115 A1* | 2/2005 | Anderson | B29C 33/04 |
| | | | 219/759 |
| 2008/0128078 A1 | 6/2008 | May et al. | |
| 2010/0170613 A1* | 7/2010 | Kendall | B29C 35/02 |
| | | | 156/60 |
| 2012/0145702 A1 | 6/2012 | Miller et al. | |
| 2013/0134154 A1 | 5/2013 | Matsen et al. | |
| 2015/0013894 A1* | 1/2015 | Matsen | B23K 20/12 |
| | | | 156/272.4 |
| 2015/0137424 A1* | 5/2015 | Lyons | B29C 70/44 |
| | | | 264/317 |
| 2015/0217491 A1* | 8/2015 | Syvret | B29C 70/46 |
| | | | 296/180.1 |
| 2015/0321388 A1* | 11/2015 | Jaderberg | B29C 43/52 |
| | | | 264/403 |
| 2015/0321441 A1* | 11/2015 | Marcoe | B32B 1/08 |
| | | | 87/9 |
| 2017/0095986 A1* | 4/2017 | Feigenblum | B29C 35/0805 |
| 2017/0144337 A1* | 5/2017 | Matsen | B29C 43/52 |

* cited by examiner

ENCLOSURE FOR HEATING THREE DIMENSIONAL STRUCTURE

FIELD

The present disclosure relates generally to susceptors for use with heating blankets. More particularly, the present disclosure relates to an enclosure utilizing heating blankets to heat a three dimensional structure.

BACKGROUND

A composite part may be bonded or cured in an oven or an autoclave where heat is applied to the part while supported on a cure tool that maintains the shape of the part during the curing process. Techniques have been developed for curing composite parts without the need for an oven or autoclave, however these techniques have been limited to curing relatively small, simple parts and/or require relatively complicated and/or expensive tooling. Out-of-autoclave processing of more complex, three-dimensional composite parts is made more challenging by the need for constant, evenly distributed heat over the entire area of the part being bonded or cured. Recently, curing of relatively small composite parts has been achieved using induction heating equipment employing susceptors that produce a maximum, constant temperature when inductively heated. For example, heating blankets using inductively heated susceptors have been used to cure relatively small areas of a composite rework patch applied to a structure such as an aircraft skin. Other attempts at using inductive heating to cure composite parts have been limited to smaller, simple geometry parts and/or involve relatively complicated tooling which may be too expensive for some applications, such as curing short-run or prototype production parts.

Accordingly, there is a need for a method and device that utilizes susceptor heating blanket technology to heat a three dimensional structure so as to create a uniform temperature around a volume contained within the enclosure without using an autoclave. There is also a need for an insulated enclosure that utilizes susceptor based heating blankets for heating a complex, three dimensional structure. For example, heating blankets can be applied to a surface of a part to assist in the bonding and curing process.

SUMMARY

According to an exemplary arrangement, an enclosure for heating a three dimensional structure is disclosed. The enclosure comprising a body defining a cavity sized to receive a three dimensional structure. A plurality of heating blankets are configured to heat the three dimensional structure to a substantially uniform temperature. In one arrangement, at least one of the plurality of heating blankets comprises a conductor for receiving current and generating a magnetic field in response thereto, a first susceptor wire comprising an alloy having a first Curie temperature point, and a second susceptor wire. The second susceptor wire comprising a second Curie temperature point that is different than the first Curie temperature point of the first susceptor wire. In another arrangement, the plurality heating blankets are in contact with the three dimensional structure.

According to another arrangement, a method of heating a three dimensional structure is disclosed. The method includes the steps of defining an internal cavity of a body of an enclosure; mounting a three dimensional structure within the cavity of the enclosure; and configuring one or more inflatable bladders to exert pressure on the three dimensional structure. The method also includes the step of utilizing one or more inflatable bladders to exert a pressure on the heating blankets so as to maintain the heating blankets against the three dimensional structure; activating the heating blankets; heating the three dimensional structure to a predetermined temperature and utilizing the heating blankets to provide a uniform temperature of the three dimensional structure. The method may also include the steps of insulating the enclosure by way of an insulation layer so as to efficiently maintain the heat generated within the enclosure. The method may also include the step of positioning one or more spacers between one or more bladders and the three dimensional structure. The method may also include the step of utilizing one or more inflatable bladders to exert a predetermined pressure on the heating blankets so as to maintain the heating blankets against the three dimensional structure; and heating the three dimensional structure to the predetermined temperature and at a desired pressure created by the one or more inflatable bladders. In one arrangement, the method includes the step of utilizing the heating blankets to provide a uniform temperature of the three dimensional structure, wherein the uniform temperature propagates into and through the structure so as to properly cure the three dimensional structure.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further structures and descriptions thereof, will best be understood by reference to the following detailed description of an illustrative embodiment of the present disclosure when read in conjunction with the accompanying drawings, wherein:

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
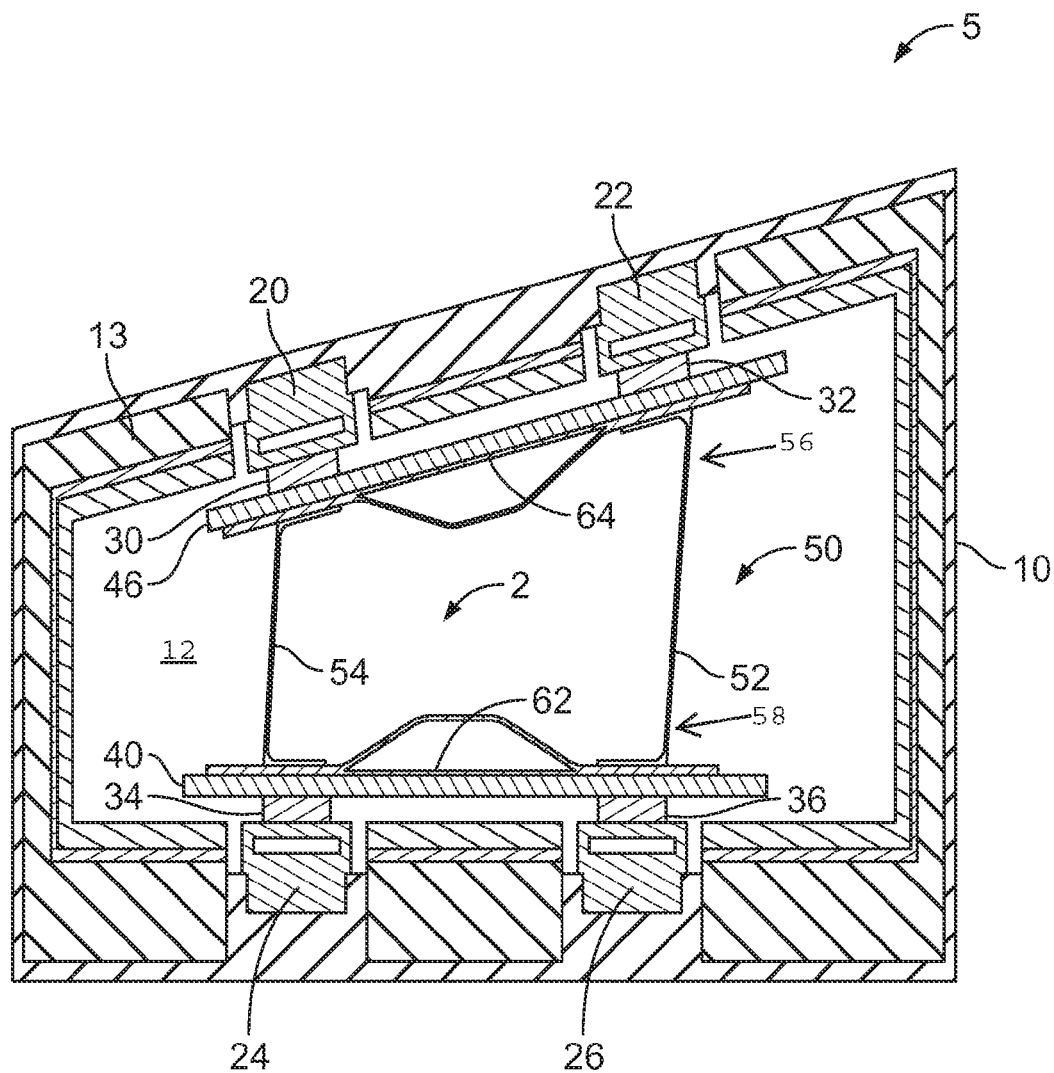
FIG. 1 is one illustration of an enclosure for heating a three dimensional structure, the enclosure utilizing at least one heating blanket according to one aspect of the present disclosure.

FIG. 1 is one illustration of an insulated enclosure 5 for heating a three dimensional structure 50, the enclosure utilizing a heating blanket according to one aspect of the present disclosure. In this illustrated enclosure arrangement, the enclosure 5 utilizes a plurality of heating blankets, such as the heating blankets discussed and illustrated herein. Specifically, the enclosure may be used to uniformly heat and cure a three dimensional structure, such as a wing structure 50.

The insulated enclosure 5 comprises a body 10 that defines an internal cavity 12. The body 10 is preferably insulated by way of an insulation layer 13 so as to efficiently maintain the heat generated within the enclosure 5 and therefore reduce electrical consumption during the heating or curing process of the three dimensional structure 50. The heat 44 generated within the insulated enclosure 5 is generated by at least one, and preferably two susceptor based heating blankets, as described in greater detail herein. For example, in the illustrated insulated enclosure 5 illustrated in FIG. 1, two susceptor based heating blankets 40, 46 are utilized.

As illustrated, this wing structure 50 comprises two vertically extending aluminum spars 52, 54 that tend to act as heat sinks. The heating blankets 40, 46 provide a uniform temperature to bond a three dimensional structure 50 so as to properly cure the three dimensional structure 50 and avoid overheating the structure. The insulated enclosure 5 is utilized to adhesively bond these spars 52, 54 to both a bottom skin portion 62 and a top skin portion 64 of the wing structure 50. Advantageously, the illustrated enclosure arrangement may utilize one or more heat blankets as herein disclosed. One advantage of such a heating enclosure 5 is that natural heat convection may be utilized to achieve proper cure, rather than requiring a controlled heated environment, such as by way of a typical autoclave. As such, the enclosure 5 does not require any type of additional external fan or external air circulation equipment to carry out such a curing process.

As illustrated, the three dimensional structure 50 is illustrated as being mounted inside the cavity 12 of the enclosure 5. To facilitate this mounting, the enclosure 5 comprises a plurality of inflatable bladders. In this illustrated arrangement, the enclosure 5 is provided with four different inflatable bladders 20, 22, 24, and 26. As illustrated, two of these inflatable bladders 20, 22 are configured to exert pressure on a top portion 56 of the three dimensional structure and two of these inflatable bladders 24, 26 exert a pressure on a bottom portion 58 of the three dimensional structure 50. In addition, various spacer elements may be provided between the various bladders and the three dimensional structure. For example, a first spacer 30 is positioned between a first bladder 20 and a first portion of the first heating blanket 46 and a second spacer 32 is positioned between a second bladder 22 and a second portion of the first heating blanket 46. Similarly, a third spacer 34 is positioned between a third bladder 24 and a first portion of the second heating blanket 40 and a fourth spacer 36 is positioned between a fourth bladder 26 and a second portion of the second heating blanket 40.

The various inflatable bladders 20, 22, 24, 26 are configured to exert a pressure on the heating blankets 40, 46 so as to maintain the heating blankets against an outside surface of the three dimensional structure, preferably at a predetermined pressure. More specifically, when bonding certain structures together, specifications require that a certain amount of force is applied to the adhesive at a certain temperature to adequately complete the curing process. In this case, the various inflatable bladders 20, 22, 24, 26 are extended from the body 10 of the enclosure 5 so as to make contact with the blankets 40, 46. The inflatable bladders 20, 22, 24, 26 press the blankets 40, 46 via the spacers 30, 32, 34, and 36 against the three dimensional structure 50 at the predetermined pressure. Spacers 30, 32, 34, and 36 positioned between the inflatable bladders 20, 22, 24, and 26 and the heating blankets 40, 46 help to ensure proper pressure is applied to the three dimensional structure 50 during the bonding process.

As will be described herein, the heating blankets 46, 40 may be activated by way of a controller, sensor, and power supply so as to heat the three dimensional structure to the predetermined temperature and at the desired pressure created by the inflatable bladders 20, 22, 24, and 26. Preferably, the insulated enclosure 5 may be used to heat a three dimensional structure 50 for bonding, curing, repair, sealants, liquid shims, etc. As the susceptor based heating blankets 40, 46 provide a uniform temperature of the three dimensional structure, the uniform temperature propagates into and through the structure.

Figure 2:
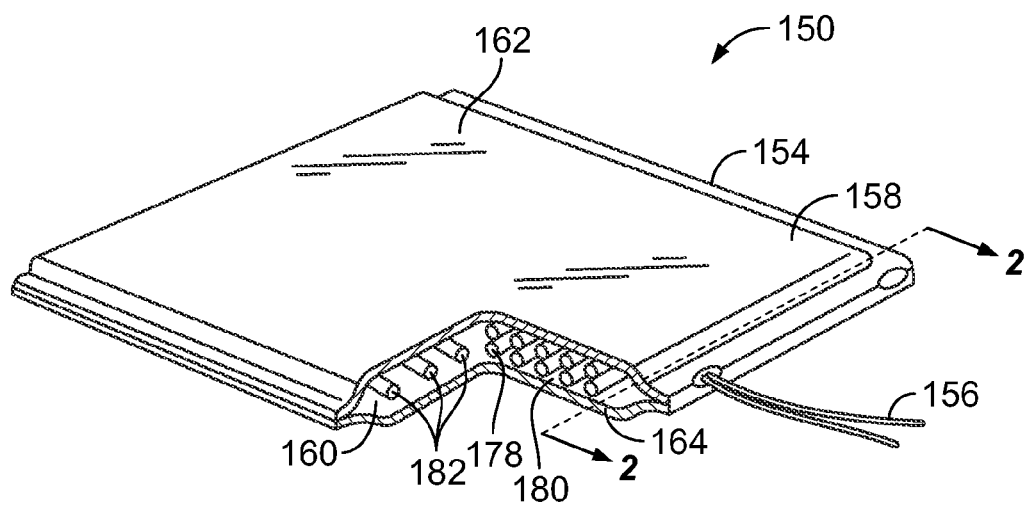
FIG. 2 is a perspective illustration of a heating blanket in an embodiment as may be used for heating a three dimensional structure, the heating blanket comprising a flattened helical wire conductor positioned perpendicular to an array of susceptor wires that are positioned within the flattened helical wire conductor.
Figure 3:
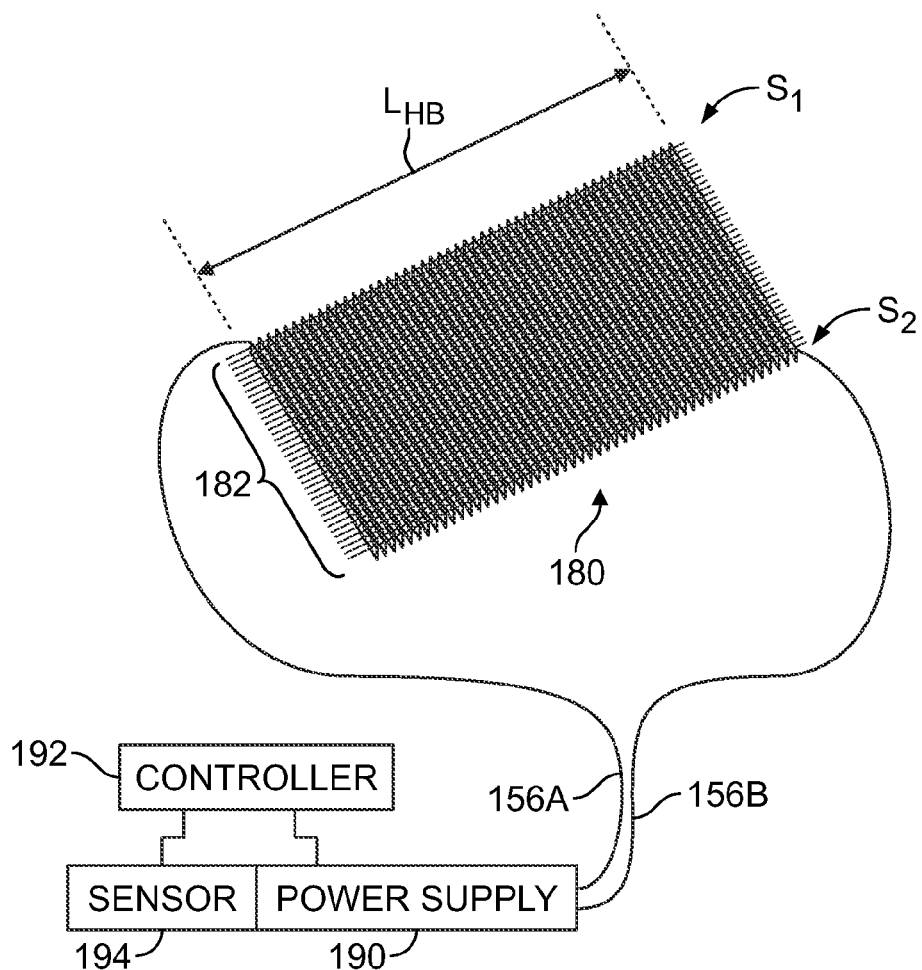
FIG. 3 is a schematic illustration of the heating blanket illustrated in FIG. 2 (with the housing and matrix removed) illustrating the helical wire conductor connected to a power supply, a controller, and a sensor, and with an linear array of susceptor wires contained within the helical wire conductor.

FIG. 2 is a perspective illustration of a heating blanket 154 in an embodiment as may be used with a three dimensional structure, such as the structure illustrated in FIG. 1. The heating blanket 154 comprising a flattened helical wire conductor 180 and a linear array of susceptor wires 182. Preferably, the linear array of susceptor wires 182 are positioned within alternating conductors of the helical wire conductor 180 of the heating blanket. More preferably, the linear array of susceptor wires 182 are arranged perpendicular to the plurality of conductor portions making up the helical wire conductor 180. In one preferred arrangement, the flattened helical wire conductor 180 comprises a Litz wire that is wound in a flattened helical like structure (e.g., a solenoid) so as to define a plurality of alternating conductors. For example, FIG. 3 is a schematic illustration of the heating blanket 154 illustrated in FIG. 2 (with the heating blanket housing 158 and matrix 178 removed) so as to illustrate the helical wire conductor 180 connected to a power supply 190, a controller 192, and a sensor 194. As illustrated, the helical wire conductor 180 comprises a unitary wire that winds back and forth between a first side $S_1$ of the heating blanket 154 and a second side $S_2$ of the heating blanket in a flattened helical structure, along a length $L_{HB}$ of the heating blanket 154. Importantly, in this illustrated arrangement of the heating blanket 154, the linear array of susceptor wires 182 are positioned between the alternating conductors or wires making up the helical wire conductor 180 for inductive heating of the array of susceptor wires 182 in the presence of an alternating current provided by the p source 190. The inductively heated array of susceptor wires 182 thermally conducts heat to a matrix 178 (FIG. 2). The matrix 178 may thermally conduct heat to a structure to which the heating blanket 154 is positioned against.

Referring to FIGS. 2 and 3, the heating blanket 154 may include a housing 158 defining an interior 160. This interior may be formed of a suitable material which is preferably thermally conductive and which may also be flexible and/or resilient such that the heating blanket 154 may conform to curved areas to which it may be applied. In this regard, the housing 158 is preferably formed of a pliable and/or conformable material having a relatively high thermal conductivity and relatively low electrical conductivity. The housing 158 may comprise upper and lower face sheets 162, 164 formed of silicone, rubber, polyurethane or other suitable elastomeric or flexible material that provides dimensional stability to the housing 158 while maintaining flexibility for conforming the heating blanket 154 to curved surfaces. Although shown as having a generally hollow interior 160 bounded by the upper and lower face sheets 162, 164, the housing 158 may comprise an arrangement wherein the conductor 180 and the associated magnetic material are integrated or embedded within the housing 158 such that the conductor 180 is encapsulated within the housing 158 to form a unitary structure 150 that is preferably flexible for conforming to curved surfaces.

FIG. 3 illustrates a perspective view of certain components of the heating blanket 154 showing the flattened helical structure of the conductor 180 and the array of susceptor wires 182 residing within this helical structure in greater detail. In one preferred arrangement, and as illustrated in FIG. 3, the susceptor wires 182 are arranged within the helical conductor 180 such that a longitudinal axis of the array of susceptor wires 182 resides substantially perpendicular to an electrical current flowing through the helical conductor 180. In this manner, the varying magnetic fields generated by the helical conductor 180 induce eddy currents in the array of susceptor wires 182 as will be discussed in greater detail herein.

A power supply 190 providing alternating current power may be connected to the heating blanket 154 by means of the heating blanket wiring 156 A,B. The power supply 190 may be configured as a portable or fixed power supply 190 which may be connected to a conventional 60 Hz, 110 volt or 220 volt, (480V or higher as necessary to deliver power to very large blankets) outlet. Although the power supply 190 may be connected to a conventional 60 Hz outlet, the frequency of the alternating current that is provided to the conductor 180 may preferably range from approximately 1,000 Hz to approximately 400,000 Hz. In some cases, the frequency of the alternating current provided to the conductor 180 may be as high as 4 MHz. The voltage provided to the conductor 180 may range from approximately 10 volts to 1,000-2,000 volts but is preferably less than approximately 450 volts. Likewise, the alternating current provided to the conductor 180 by the power supply is preferably between approximately 10 amps and approximately 1000 amps.

Figure 4:
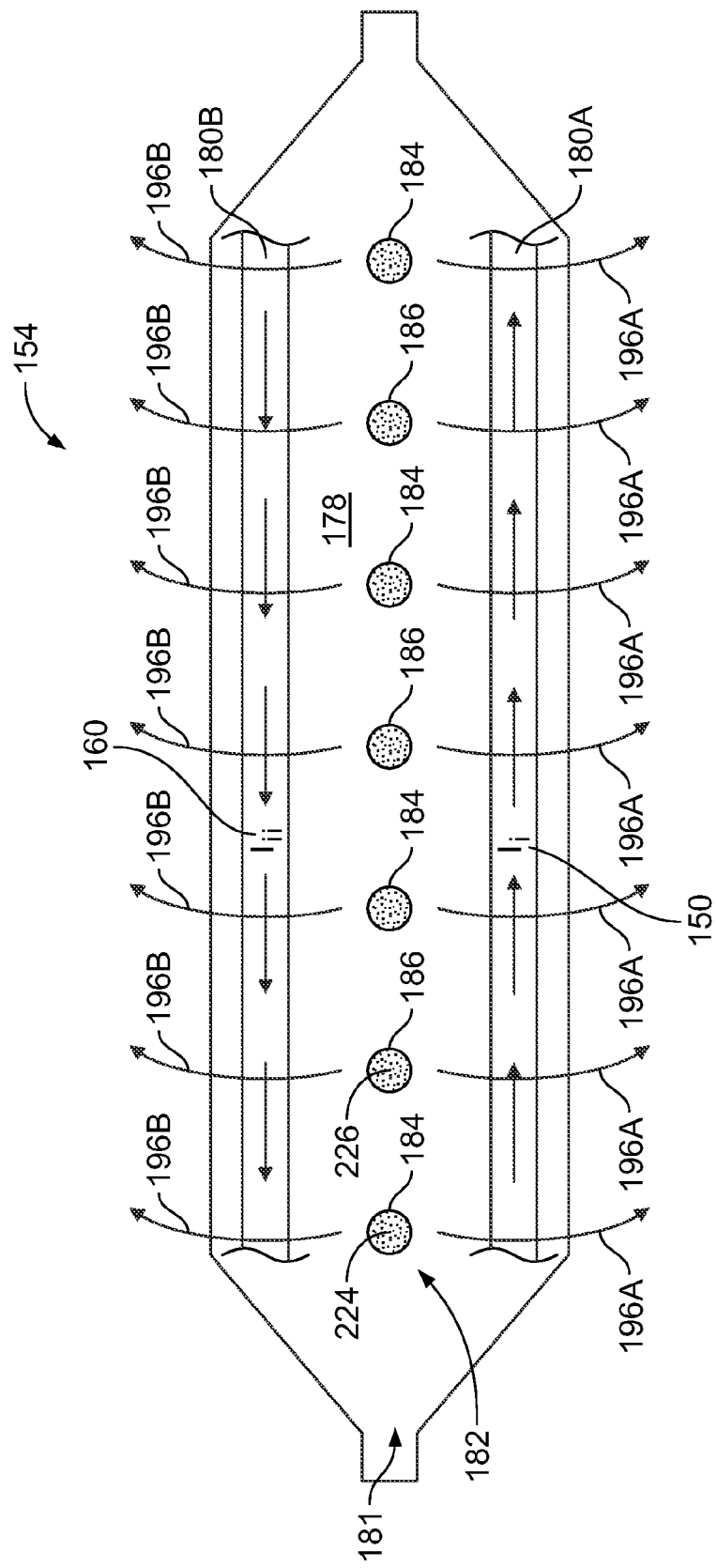
FIG. 4 is a cross-sectional illustration of the heating blanket taken along line 2-2 of FIG. 2 and illustrating the linear array of susceptor wires provided within the helical wire conductor for induction heating thereof in response to magnetic fields generated by an alternating current applied to the helical wire conductor.

FIG. 4 illustrates a cross sectional view of the array of susceptor wires 182 that may be used with the heating blankets illustrated in FIGS. 1-3 taken along line 2-2 of FIG. 2. As illustrated, the linear array of susceptor wires 182 comprises a first plurality of susceptor wires 184, 186 arranged in at least one row 181. In an alternative linear array arrangement, the linear array of susceptor wires 182 comprises a second plurality of susceptor s arranged in a second row.

In one preferred arrangement, at least one of the first plurality of susceptor wires within the linear array 182 comprises a magnetic material having a first Curie temperature. In addition, at least one of the plurality of susceptor wires within the linear array 182 comprises a magnetic material having a second Curie temperature, the second Curie temperature being different than the first Curie temperature of the first susceptor wire.

As illustrated in FIG. 4, in one arrangement, the linear array of susceptor wires 182 comprises a plurality of first susceptor wires 184 and a plurality of second susceptor wires 186 within the linear array of susceptor wires 182. Preferably, in one arrangement, the first plurality of susceptor wires 184 comprise a first Curie temperature alloy 224 and the second plurality of susceptor wires 186 comprises a second Curie temperature alloy 226 that is different from the first Curie temperature alloy of the first susceptor wire 224.

As those of ordinary skill will recognize, alternative susceptor array 182 may also be utilized. As just one example, the linear susceptor array 188 may comprise a plurality of third susceptor wires comprising a third Curie temperature alloy. In such an arrangement, the third Curie temperature alloy may be different than the first Curie temperature alloy 224 of the first susceptor wire 184 and also different than the second Curie temperature alloy 226 of the second susceptor wire 186.

In addition, in one exemplary linear array arrangement, the linear array 182 may comprise an equal number of the first susceptor wires 184 and the second susceptor wires 186. In one preferred arrangement, the linear array 182 comprises an unequal number of the first susceptor wires 184 and the second susceptor wires 186. Alternatively, where the linear array 182 further comprises a plurality of third susceptor wires, the number of these third susceptor wires may be same as, greater than or less than the number of first susceptor wires 184. Similarly, the number of third susceptor wires may be same as, greater than or less than the number of second susceptor wires 186. In an alternative arrangement, more of the first or second susceptor wires 184, 186 may be provided. In addition, a diameter size of the first susceptor wires 184, a diameter size of the second susceptor wires 186, and a diameter size of the third susceptor wires may all be the same or may all be different. However, as those of ordinary skill in the relevant art will recognize, alternative sized susceptor wire arrangements may be provided. As just one example, the first susceptor wires 184 may comprise may comprise a 10 mil diameter, the second susceptor wires 186 may comprise 13 mil diameter, and the third susceptor wires may comprise 15 mil diameter. Of course, alternative linear arrangements comprising different wire sizes may also be used.

Increasing the number of different susceptor wire types provided within the linear susceptor array 182 can be beneficial to obtaining an enhanced temperature regulation over an even wider range of operating temperatures.

In one preferred arrangement, the first susceptor conductor 184 comprises a first Curie temperature alloy 224 and the second susceptor conductor 186 comprises a second Curie temperature alloy 228 wherein the second Curie temperature of the second susceptor conductor 186 is a lower temperature than the first Curie temperature alloy of the first susceptor conductor 184. In one preferred arrangement, the first Curie temperature alloy comprises Alloy 34 having 34% Ni and 66% Fe having a Curie temperature point about 450° F. and comprises a negligible magnetic properties above 400° F. In this same arrangement, the second Curie temperature alloy comprises Alloy having 32% Ni and 68% Fe having a Curie temperature of about 392° F. and comprises a negligible magnetic properties above 250° F.

The magnetic fields generated by the alternating current flowing through the helical conductor 180 wound in a Litz wire flattened helix (or solenoid) and inducing eddy currents within the array of susceptor wires 182 will now be described with reference to FIG. 4. As those of ordinary skill in the art recognize, a Litz wire is typically used to carry alternating current and may consist of many thin wire strands, individually insulated and twisted or woven together.

Figure 6:
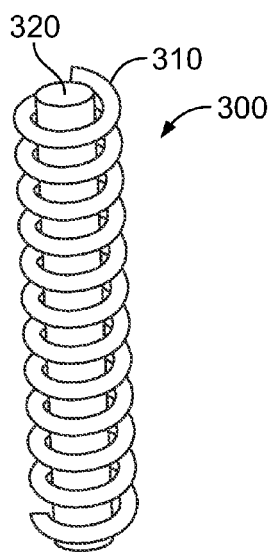
FIG. 6 is an illustration of an alternative susceptor and conductor arrangement that may be used in a heating blanket, such as one or more heating blankets illustrated in FIGS. 1-3.

As can be seen as an example in FIG. 6, seven susceptor wires 184, 186 are illustrated and these wire reside in a row, adjacent one another and between two alternating conductors of a helical conductor 180, such as the helical conductor 180 illustrated in FIG. 3. In one preferred helical conductor arrangement, the helical conductor is of unitary construction and comprises a single conductor that is wound from one end of the heating blanket to the other in a continuous, flattened helix shape. As just one example, if the helical conductor comprises a single conductor such as helical conductor 180 illustrated in FIG. 3, this single conductor 180 may make ten (10) turns per inch in the helix.

In an alternative helical conductor arrangement, the helical conductor may comprise two or more conductors forming two or more parallel circuits. Utilizing two or more conductors does not materially affect the generated magnetic field as long as each conductor carriers the same amount of current as the single conductor. With such a multiple conductor helical configuration, the controller 192 and sensor 194 may be operated to adjust and maintain this type of desired current control. One advantage of such a multiple conductor helical configuration is that it acts to reduce the voltage need to provide current from one end of the blanket to the other end of the blanket. For example, instead of having one conductor making ten (10) turns per inch in the helix, the multiple conductor configuration may have, for example, ten (10) conductors making one (1) turn per inch.

Another advantage of such a multiple conductor helical configuration is that it acts to reduce the voltage needed to provide current from one end of the blanket to the other end of the blanket. For example, a separate conductor helical configuration may be utilized to activate a first susceptor conductor whereas a second separate conductor may be utilized to activate a second susceptor conductor. As such, in one exemplary arrangement, under the operation and control of the controller (FIG. 3), different susceptor wires within the susceptor array may be activated at different times or points within the heating process.

Returning to FIG. 4, the linear array 182 comprises a plurality of first susceptor wires 184 having a first Curie temperature 24 and a plurality of second susceptor wires 186 having a second Curie temperature 226. The first Curie temperature being lower than the second Curie temperature. In this illustrated arrangement, the first susceptor wires 184 may be positioned adjacent two of the plurality of second susceptor wires 186. In addition, the susceptor linear array 182 may be positioned an equal distance from both a first, lower conductor portion 180A and a second, upper conductor portion 180B. The susceptor wires are preferably electrically insulated from these conductor portions 180A,B.

Initially, the application of a first alternating current $I_i$ 250 by way of a power source (FIG. 3) to the first conductor portion 180A produces an alternating magnetic field lines 196A that comprise concentric circles around the cylindrically current carrying conductor 180A. In FIG. 4, these concentric circles 196A may be illustrated as comprising a first magnetic field 196 which is illustrated as directed perpendicularly out of the paper. Similarly, the application of a second alternating current $I_i$ 260 (flowing in an opposite direction as the first alternation current $I_i$ 250) through the second conductor portion 180B produces an alternating magnetic field lines 196B that comprise concentric circles around the cylindrically current carrying conductor 180B.

Because of the orientation of the first and second magnetic fields 196A,B, these fields 196A,B will essentially cancel each another out on the outside of the blanket 154, below the first conductor 180A as they reside in opposite directions. Similarly, above the second or upper conductor 180B on the outside of the blanket 154, the first and second magnetic fields 196A,B will also essentially cancel one another out. In contrast, within the heating blanket matrix 178 and hence within the susceptor linear array 182, the first and second magnetic fields 196A,B will be additive to one another since both fields are oriented substantially parallel to the axis of the susceptor wires linear array 182. This substantially parallel combined oscillating magnetic field 196A,B will therefore generate eddy currents that travel circumferentially within the susceptors 184, 186 contained within the susceptor array 182. Therefore, both the susceptors 184, 186 will generate heat simultaneously with the application of the magnetic fields 196A,B.

Initially, the concentration of the magnetic fields 196A,B results in relatively large eddy currents generated in the plurality of first susceptor wires 184 having the lower Curie temperature as well as eddy currents generated in the plurality of second susceptor wires 186 having the higher curie temperature. As illustrated, eddy currents are generated in both the lower and higher Curie temperature materials 184, 186 as long as a susceptor has high permeability and is of sufficient diameter so that the skin depth is substantially smaller than the wire radius. In the present disclosure, and in this illustrated arrangement, the second susceptor does not dominate heating at low temperature by having a smaller concentration of the second susceptor than the first. The induced eddy currents in both the first and second materials result in resistive heating of the first and second susceptor wires 184 and 186. Although most of the heating is provided by way of the lower Curie temperature material, the eddy currents within the higher Curie susceptor 186 will also provide a certain amount of resistive heating at lower temperatures, albeit less than the heat generated by way of lower Curie temperature susceptor 184. As such, the first susceptor wire 184 and the second susceptor wire 186 both act to conductively heat the matrix 178 and the structure in thermal contact with the heating blanket 154, such as the wing structure 50 illustrated in FIG. 1. The heating of the first susceptor wire 184 and second susceptor wire 186 continues during application of the alternating current until the magnetic material of the first susceptor wire 184 approaches its Curie temperature, which again in this illustrated arrangement is lower than the Curie temperature of the second susceptor wire 184.

Upon approaching the temperature where the magnetic properties of the first susceptor wire 184 becomes negligible, the first susceptor wire 184 becomes non-magnetic. At this non-magnetic point, the magnetic fields 196A,B generated by the first conductor portion and the second conductor portion 180A,B continue to generate eddy currents in the higher Curie temperature susceptor because it is still electrically conductive due to its higher Curie temperature. As such, once the lower Curie temperature of the first susceptor wire 184 is achieved, temperature regulation by way of both the first susceptor wire 184 and the second susceptor wire 186 continue, albeit at a higher Curie temperature.

As the first susceptor wire 184 no longer generates heat, the concentration of the magnetic field 196B continues to generate large eddy currents in the second susceptor wire 186. The continued induction of eddy currents within both the first and second susceptor wire 186 result in resistive heating of the second susceptor wire 186. The first and second susceptor wire 186 therefore continue to conductively heat the matrix 178 and the structure in thermal contact with the heating blanket 154. The heating of the susceptor wire 186 continues during application of the alternating current $I_i$ 250 and $I_{ii}$ 260 until the magnetic material of the susceptor wire 186 approaches its Curie temperature, which again in this illustrated arrangement comprises a higher Curie temperature than the Curie temperature of the first susceptor wire 184. Upon reaching the higher Curie temperature of the second susceptor wire 186, the susceptor wire 186 becomes non-magnetic. At this non-magnetic point, the magnetic fields 196A,B are no longer concentrated in the susceptor wire 186. The induced eddy currents and associated resistive heating of the susceptor wire 186 therefore diminishes to a level sufficient to maintain the temperature of the first and second susceptor wire 186 at the higher Curie temperature.

Figure 5:
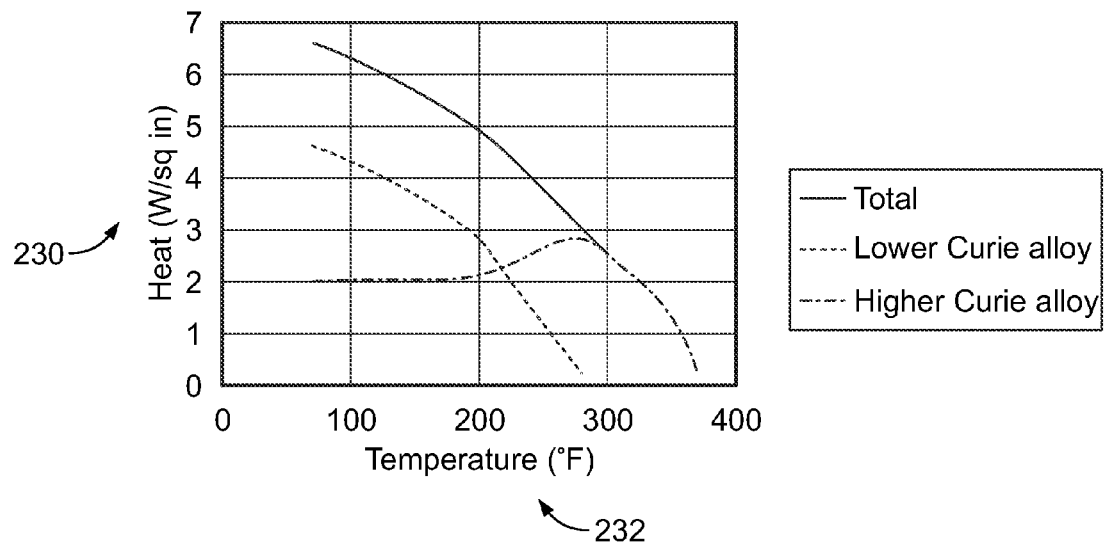
FIG. 5 is an illustration of a plot of heat output measured over temperature for an embodiment of an exemplary array of susceptor wires.

As an example of the heating of the magnetic material to the Curie temperature, FIG. 5 illustrates a plot of heat output 230 measured over temperature 232 for an exemplary heating blanket comprising an array of susceptors as disclosed herein. Specifically, the heating blanket may comprise an array of susceptors mounted within a conductor 180 wherein the conductor 180 comprises a Litz wire formed as a flattened helix as illustrated in FIG. 3. To generate the data presented in this graph, the array of susceptors comprise a 2:1 mixture of a first plurality of first susceptor wires comprising Alloy 32 and a second plurality of second susceptor wires Alloy 34, wherein each of the first and second wires comprised a 10 mil diameter. Both first and second susceptor wires were inductively heated by way of a 300 KHz magnetic field whose amplitude was increased from 5 Oe to 10 Oe as the temperature rises to compensate for increasing heat losses that occur at higher temperature. The first plurality of first susceptor wires comprised a susceptor wire comprising a 10 mil diameter alloy 32 (32% Ni and 68% Fe). The second plurality of second susceptor wires comprised a susceptor wire comprising a 10 mil diameter alloy 34 (34% Ni and 66% Fe) wire. In this susceptor wire arrangement, the susceptor array comprises a 12 mil center-to-center spacing. As those of ordinary skill in the art will recognize, alternative diameter sizes and center-to-center spacing configurations may also be utilized. As can be seen in FIG. 5, this susceptor arrangement provided an extended useful temperature range for such a susceptor including a controlled temperature range from about 150° F. to about 380° F. It should be noted that typically, in certain applications, more heat is needed to compensate for higher heat losses at higher temperatures as those temperatures illustrated in FIG. 5. In order to provide the required increase in heat, the current and therefore the magnetic fields may be increased as necessary by increasing the power supply current. This increase in current will effectively shift the curve in FIG. 5 upward so as to provide a desired amount of heat while still maintaining the same negative slope curve shape whine providing a greater amount of heat to cooler areas, such as those located near heat sinks. (e.g., such as the two vertically extending aluminum spars 52, 54 illustrated in FIG. 1).

FIG. 6 is an illustration of an alternative susceptor and conductor arrangement 300 that may be used in a heating blanket, such as the heating blankets illustrated in FIG. 1. In this illustrated alternative arrangement 300, the susceptor 310 comprises a spring shaped susceptor and is wound around a conductor 320. In one preferred arrangement, the susceptor 310 comprises a first and second susceptor wire arrangement as describe and illustrated herein. In an alternative preferred arrangement, the susceptor 310 comprises a first, a second, and a third susceptor wire arrangement as described and illustrated in FIG. 4, however alternative susceptor arrangements may also be utilized.

Figure 7:
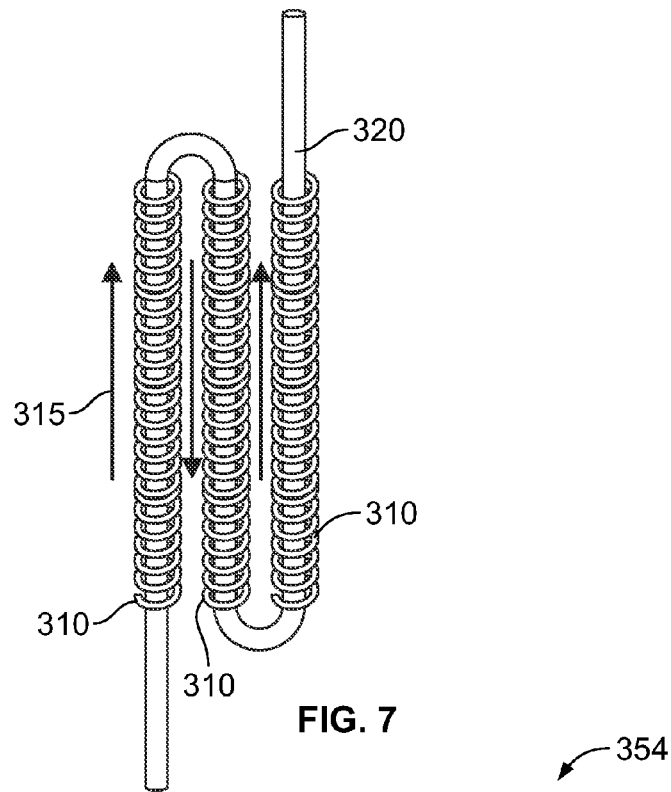
FIG. 7 is an illustration of an alternative heating blanket layout of the alternative susceptor and conductor arrangement illustrated in FIG. 6.
Figure 8:
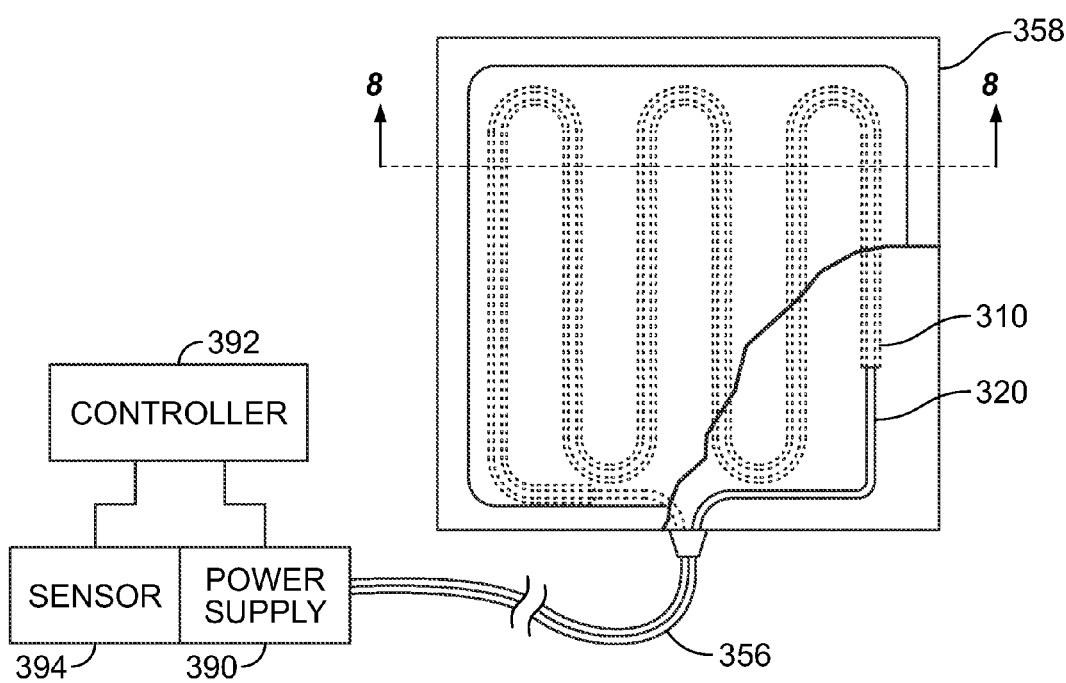
FIG. 8 is a schematic illustration of an alternative heating blanket connected to a power supply, a controller and a sensor and illustrating the susceptor and conductor arrangement illustrated in FIG. 6 housed within a housing of the heating blanket.

FIG. 7 is an illustration of an alternative layout of the alternative susceptor and conductor arrangement illustrated in FIG. 6. And FIG. 8 illustrates a top view of an alternative heating blanket arrangement 354 showing the meandering pattern of the conductor 320 and the array of susceptor wires 310 within the housing 358. In one preferred arrangement, the array of susceptor wires 310 comprise spring formed wires as illustrated in FIG. 6. Such susceptor wires 310 may be wound around the conductor 320 such that a longitudinal axis of the of susceptor wires 310 is substantially perpendicular to an electrical current flowing through the conductor 320 and generating a magnetic field parallel to the longitudinal axis of the susceptor wires 310. In this manner, a varying magnetic field generated by the conductor 320 induces eddy currents in the array of susceptor wires 310 as discussed in greater detail herein.

A power supply 390 providing alternating current electric power may be connected to the heating blanket 354 by means of the heating blanket wiring 356. The power supply 390 may be configured as a portable or fixed power supply 390 which may be connected to a conventional 60 Hz, 110 volt or 220 volt outlet. Although the power supply 390 may be connected to a conventional 60 Hz outlet, the frequency of the alternating current that is provided to the conductor 320 may preferably range from approximately 1000 Hz to approximately 400,000 Hz. In some cases, the frequency of the alternating current may be as high as 4 MHz. The voltage provided to the conductor 320 may range from approximately 10 volts to 1,000-2,000 volts but is preferably less than approximately 450 volts. Likewise, the frequency of the alternating current provided to the conductor 320 by the power supply is preferably between approximately 10 amps and approximately 1000 amps. In this regard, the power supply 390 may be provided in a constant-current configuration wherein the voltage across the conductor 320 may decrease as the magnetic materials within the heating blanket 354 approach the Curie temperature at which the voltage may cease to increase when the Curie temperature is reached as described in greater detail below.

Figure 9:
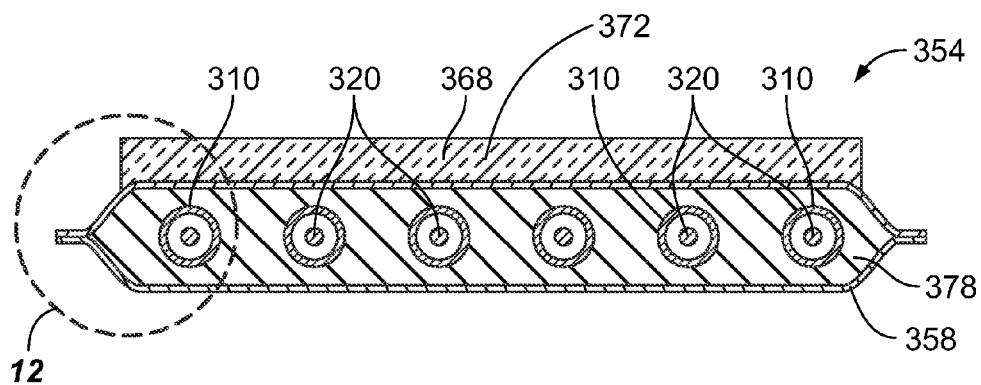
FIG. 9 is a cross-sectional illustration of the heating blanket taken along line 8-8 of FIG. 8 and illustrating the conductor provided with a plurality of susceptor wires spirally surrounding the conductor for induction heating thereof in response to a magnetic field generated by an alternating current applied to the conductor.
Figure 10:
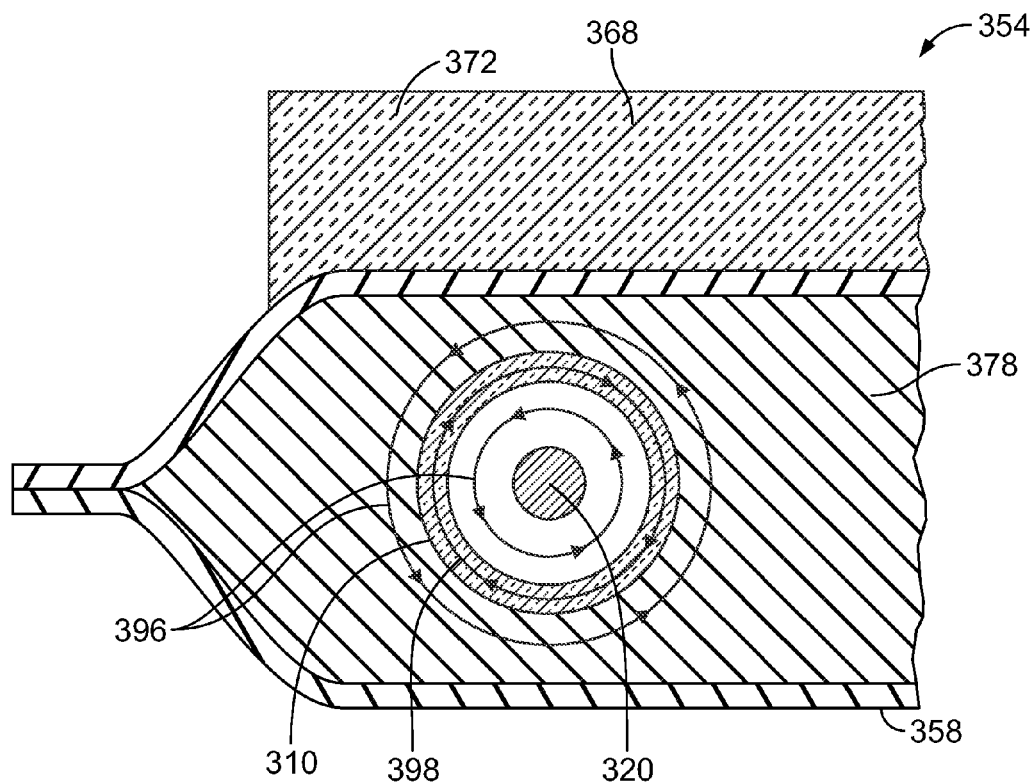
FIG. 10 is an enlarged sectional illustration of the conductor and susceptor arrangement of FIG. 9 surrounded by thermally conductive matrix and illustrating a magnetic field encircling the susceptor wires and generating an eddy current in the susceptor wires oriented in a direction opposite the direction of the magnetic field.

Referring to FIGS. 9 and 10, shown is an embodiment of the magnetic blanket 354 having a spring susceptor 310 formed of magnetic material having a Curie temperature and provided around a conductor 320. The susceptor 310 may be formed as a solid or unitary component in a cylindrical arrangement in a spiral or spring configuration around the conductor 320 in order to enhance the flexibility of the heating blanket 354. As just one example, the susceptor 310 may comprise a first plurality of first susceptor wires having a first Curie temperature and a second plurality of second susceptor wires having a second Curie temperature, as illustrated in FIG. 4. The first Curie temperature being lower than the second Curie temperature.

As can be seen in FIG. 10, the susceptor 310 may extend along a length of the conductor 320 within the housing 358. The application of alternating current to the conductor 320 produces an alternating magnetic field 396. The magnetic field 396 is absorbed by the magnetic material from which the susceptor 310 is formed causing the susceptor 310 to be inductively heated.

More particularly and referring to FIG. 10, the flow of alternating current through the conductor 320 results in the generation of the magnetic field 396 surrounding the susceptor 310. Eddy currents 398 generated within the susceptor 310 as a result of exposure thereof to the magnetic field 396 causes inductive heating of the susceptor 310. The housing 358 may include a thermally conductive matrix 378 material such as silicone to facilitate thermal conduction of the heat generated by the susceptor 310 to the surface of the heating blanket 354. The magnetic material from which the susceptor 310 is formed preferably has a high magnetic permeability and a Curie temperature that corresponds to the desired temperature to which a structure is to be heated by the heating blanket 354. The susceptor 310 and conductor 320 are preferably sized and configured such that at temperatures below the Curie temperature of the magnetic material, the magnetic field 396 is concentrated in the susceptor 310 due to the magnetic permeability of the material.

As a result of the close proximity of the susceptor 310 to the conductor 320, the concentration of the magnetic field 396 results in relatively large eddy currents 398 in the susceptor 310. The induced eddy currents 398 result in resistive heating of the susceptor 310. The susceptor 310 conductively heats the matrix 378 and a structure (e.g., structure 50 in FIG. 1) in thermal contact with the heating blanket 354. The heating of the first and second susceptor wires of the susceptor 310 occurs as previously described herein with reference to FIG. 4.

The magnetic materials of the first susceptor wire and the second susceptor wire may be provided in a variety of compositions including, but not limited to, a metal, an alloy, or any other suitable material having a suitable Curie temperature. For example, the first or second susceptor wire may be formed of an alloy having a composition of 32 wt. % Ni-64 wt. % Fe having a Curie temperature of approximately 390° F. The alloy may also be selected as having a composition of 34 wt. % Ni-66 wt. % Fe having a Curie temperature of approximately 450° F. However, the susceptor wires may be formed of a variety of other magnetic materials such as alloys which have Curie temperatures in the range of the particular application such as the range of the adhesive curing temperature or the curing temperature of the composite material from which the patch may be formed. Metals comprising the magnetic material may include iron, cobalt or nickel. Alloys from which the magnetic material may be formed may comprise a combination of the above-described metals including, but not limited to, iron, cobalt and nickel.

Likewise, the presently disclosed conductor (such as the conductor 180 illustrated in FIGS. 2-3 and the conductor 320 illustrated in FIGS. 6-9) may be formed of any suitable material having an electrical conductivity. Furthermore, the conductor is preferably formed of flexible material to facilitate the application of the heating blanket to curved surfaces. In this regard, the conductor may be formed of Litz wire or other similar wire configurations having a flexible nature and which are configured for carrying high frequency alternating current with minimal weight. The conductor material preferably possesses a relatively low electrical resistance in order to minimize unwanted and/or uncontrollable resistive heating of the conductor. The conductor may be provided as a single strand of wire of unitary construction or the conductor may be formed of braided material such as braided cable. In addition, the conductor may comprise a plurality of conductors which may be electrically connected in parallel in order to minimize the magnitude of the voltage otherwise required for relative long lengths of the conductor such as may be required for large heating blanket configurations.

Referring back to FIGS. 9 and 10, the heat blanket housing 358 may be formed of a flexible material to provide thermal conduction of heat generated by the susceptor sleeve to the structure to which the heating blanket is applied. In order to minimize environmental heat losses from the heating blanket 354, an insulation layer 368 may be included as illustrated in FIGS. 9 and 10. The insulation layer 368 may comprise insulation 372 formed of silicone or other suitable material to minimize heat loss by radiation to the environment. In addition, the insulation layer 368 may improve the safety and thermal efficiency of the heating blanket 354. As was indicated above, the housing 358 of the heating blanket 354 may be formed of any suitable high temperature material such as silicone or any other material having a suitable thermal conductivity and low electrical conductivity. Such material may include, but is not limited to, silicone, rubber and polyurethanes or any other thermally conductive material that is preferably flexible.

Referring back to FIGS. 1, 3 and 8, the heating blankets 40, 46, 154, and 354 may include thermal sensors such as thermocouples or other suitable temperature sensing devices for monitoring heat at locations along the area of the heating blankets in contact with the structure 50 (FIG. 1). Alternatively, the heating blankets may include a voltage sensor 194, 394 or other sensing devices connected to the power supply 190, 390 as illustrated in FIGS. 3 and 8.

Referring still to FIGS. 3 and 8, sensors 194, 394 may be configured to indicate the voltage level provided by power supplies 190, 390, respectively. For a constant current configuration of the herein disclosed heating blankets, the voltage may decrease as the magnetic material approaches the Curie temperature. Power supplies 190, 390 may also be configured to facilitate adjustment of the frequency of the alternating current in order to alter the heating rate of the magnetic material. In this regard, power supplies 190, 390 may be coupled to a respective controller 192, 392 in order to facilitate adjustment of the alternating current over a predetermined range in order to facilitate the application of a heating blanket to a wide variety of structures having different heating requirements.

Figure 11:
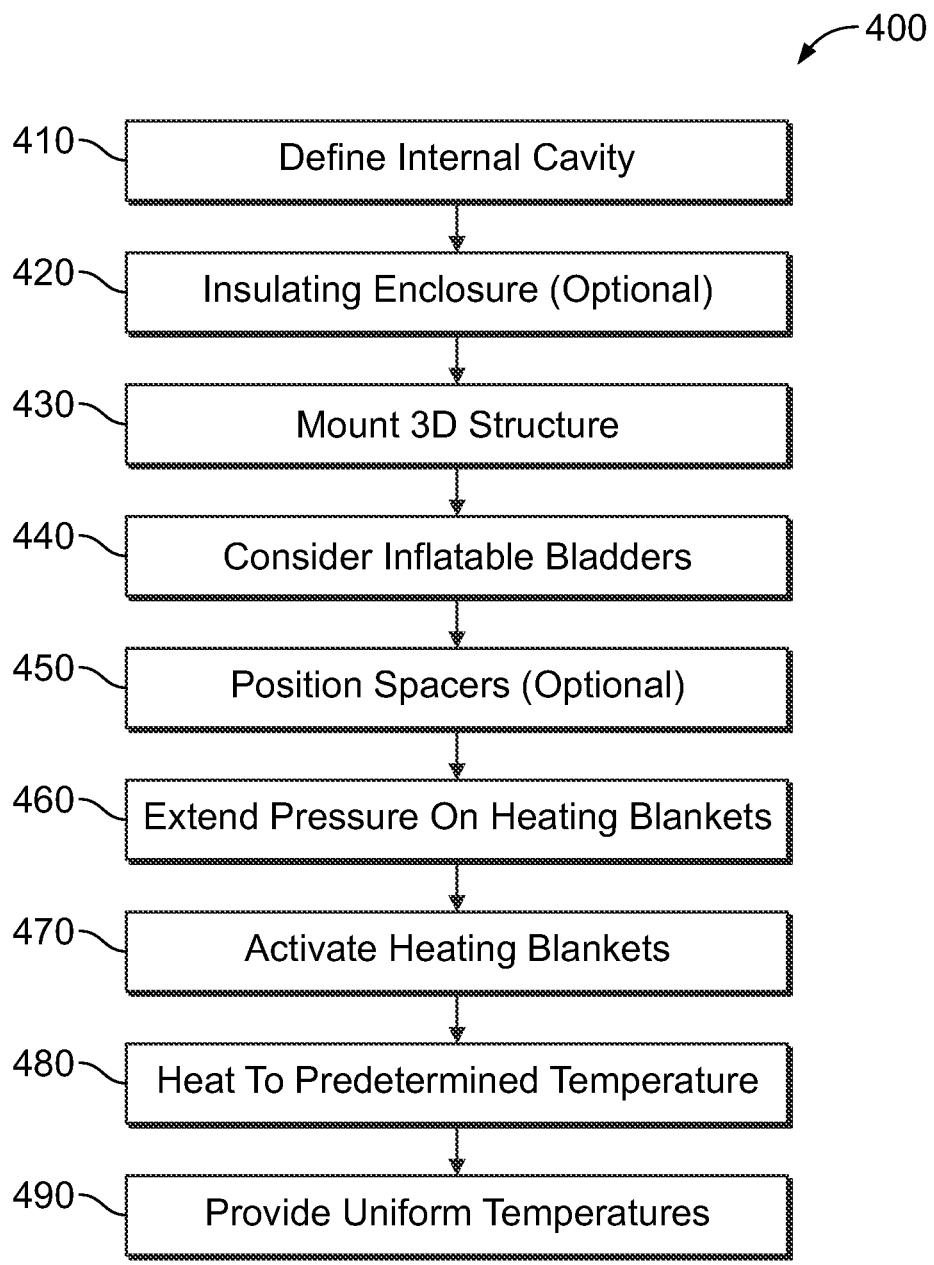
FIG. 11 illustrates steps of a method for heating a three dimensional structure using the enclosure illustrated in FIG. 1.

FIG. 11 broadly illustrates steps of a method 400 for heating a three dimensional structure using a heated enclosure, such as the heated enclosure 300 illustrated in FIG. 1 utilizing one or more heating blankets is described herein. For example, step 410 includes the step of utilizing a body of an enclosure to define an internal cavity. Optionally, at step 420, the method includes the step of insulating the enclosure by way of an insulation layer so as to efficiently maintain the heat generated within the enclosure so as to reduce electrical consumption during the heating or curing process. The step 430 includes the step of mounting the three dimensional structure within the cavity of the enclosure. At step 440, one or more inflatable bladders are configured to exert pressure on the three dimensional structure. Optionally, at step 450, the method includes the step of positioning various spacer between the various bladders and the three dimensional structure.

Next, at step 460, the method includes the step of utilizing one or more inflatable bladders to exert a pressure on the heating blankets so as to maintain the heating blankets against the three dimensional structure. Preferably, the inflatable bladders exert a predetermined pressure on the heating blankets.

At step 470, the heating blankets may be activated by way of a controller, sensor, and power supply as described herein. At step 480, the three dimensional structures are heated to a predetermined temperature and at the desired pressure created by the inflatable bladders. At step 490, the susceptor based heating blankets provide a uniform temperature of the three dimensional structure. At step 480, the uniform temperature propagates into and through the structure so as to properly cure the three dimensional structure.

The presently disclosed enclosure comprising a heating blanket comprising a susceptor wire array provides a number of advantages. For example, the enclosure provides for one or more heating blankets that provides uniform, controlled heating of large surface areas. In addition, a proper selection of the metal or alloy in the heating blanket susceptor arrays' first and second susceptor wires facilitates avoiding excessive heating of the work piece irrespective of the input power. By predetermining the first and second susceptor wire metal alloys, improved control and temperature uniformity in the work piece facilitates consistent production of work pieces. The Curie temperature phenomenon of both the first and second susceptor wires (again, more than two different types of susceptor wire materials may be utilized) is used to control both the temperature ranges as well as the absolute temperature of the work piece within the enclosure. This Curie temperature phenomenon is also utilized to obtain substantial thermal uniformity in the work piece, by matching the Curie temperature of the susceptor to the desired temperature of the induction heating operation being performed.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

We claim:

1. An enclosure for heating a three dimensional structure, the enclosure comprising:
    a body defining a cavity therein, the cavity sized to receive a three dimensional structure;
    a plurality of heating blankets configured to heat the three dimensional structure to a substantially uniform temperature; and
    at least one expandable bladder positioned such that a heating blanket of the plurality of heating blankets is positioned between the three dimensional structure and the at least one expandable bladder.

2. The enclosure of claim 1 wherein
    at least one heating blanket of the plurality of heating blankets comprises:
    a conductor configured to receive current and generate a magnetic field in response thereto;
    a first susceptor wire comprising an alloy having a first Curie temperature; and
    a second susceptor wire,
    the second susceptor wire comprising a second Curie temperature that is different than the first Curie temperature of the first susceptor wire.

3. The enclosure of claim 1 wherein
    the plurality of heating blankets are in contact with the three dimensional structure.

4. The enclosure of claim 1 wherein comprising:
    the at least one expandable bladder is configured to maintain a heating blanket of the plurality of heating blankets in contact with the three dimensional structure.

5. The enclosure of claim 1 wherein at least one heating blanket of the plurality of heating blankets comprises
    a plurality of conductors configured to receive an alternating current and generate a magnetic field in response to the alternating current.

6. The enclosure of claim 5 wherein the plurality of conductors configured to receive the alternating current comprise Litz wires.

7. The enclosure of claim 1 wherein each heating blanket of the plurality of heating blankets comprises a plurality of susceptors configured to generate heat in response to a magnetic field.

8. The enclosure of claim 1, wherein at least one heating blanket of the plurality of the heating blankets comprises:
    a first susceptor wire comprising an alloy having a first Curie temperature; and
    a second susceptor wire comprising an alloy having a second Curie temperature,
    wherein the second Curie temperature is different than the first Curie temperature of the first susceptor wire.

9. The enclosure of claim 8 wherein
    the second Curie temperature of the second susceptor wire is lower than the first Curie temperature of the first susceptor wire.

10. The enclosure of claim 8 further comprising:
    a third susceptor wire,
    the third susceptor wire comprising an alloy having a third Curie temperature.

11. The enclosure of claim 10 wherein
    the third Curie temperature of the third susceptor wire is different than the first Curie temperature of the first susceptor wire.

12. A method for heating a three dimensional structure comprising the steps of:
    defining an internal cavity of a body of an enclosure;

mounting a three dimensional structure within the cavity of the enclosure;
configuring one or more inflatable bladders to exert pressure on the three dimensional structure;
providing one or more heating blankets;
utilizing the one or more inflatable bladders to exert a pressure on the one or more heating blankets so as to maintain the one or more heating blankets against at least a portion of the three dimensional structure;
activating the heating blankets;
heating the three dimensional structure to a predetermined temperature; and
utilizing the heating blankets to provide a uniform temperature of the three dimensional structure.

13. The method of claim 12 further comprising the step of insulating the enclosure by way of an insulation layer so as to efficiently maintain the heat generated within the enclosure.

14. The method of claim 12 further comprising the step of positioning one or more spacers between the one or more bladders and the three dimensional structure.

15. The method of claim 12 further comprising the step of utilizing the one or more inflatable bladders to exert a predetermined pressure on the heating blankets so as to maintain the heating blankets against the three dimensional structure.

16. The method of claim 12 further comprising the step of activating the heating blankets by way of a controller, a sensor, and power supply.

17. The method of claim 12 further comprising the step of heating the three dimensional structure to the predetermined temperature and at a desired pressure created by the one or more inflatable bladders.

18. The method of claim 12 further comprising the step of utilizing the heating blankets to provide a uniform temperature of the three dimensional structure,
wherein the uniform temperature propagates into and through the structure so as to cure the three dimensional structure.

* * * * *